Patented Apr. 29, 1947

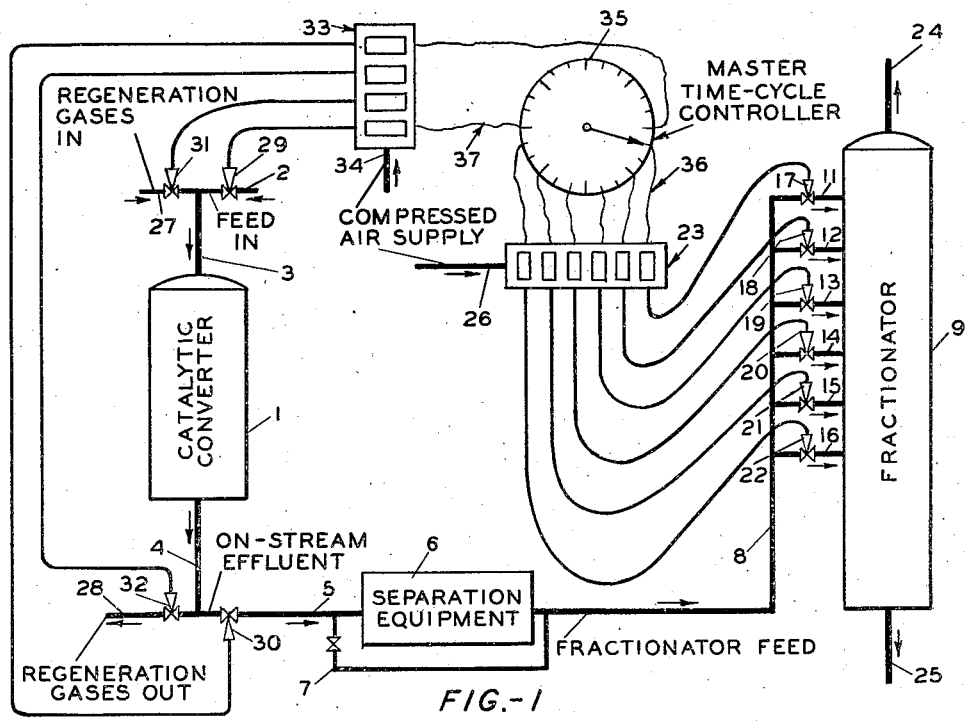
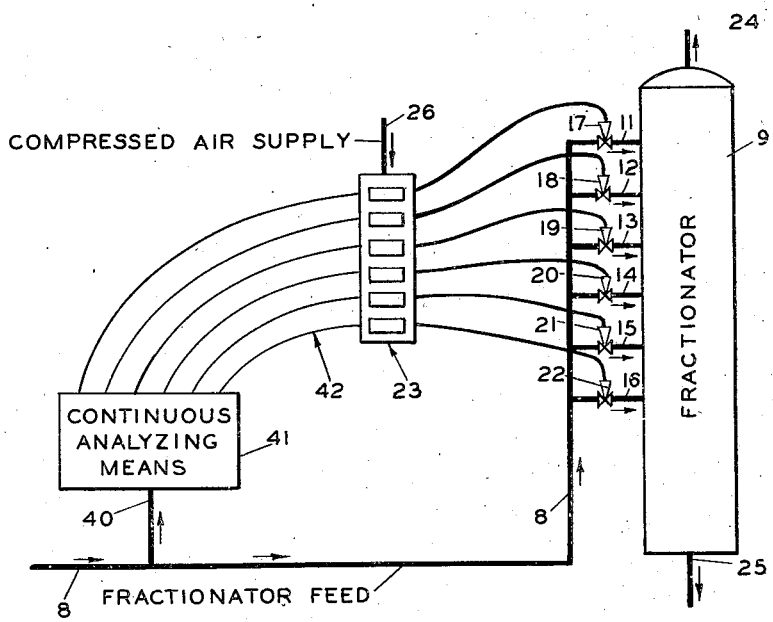

2,419,528

UNITED STATES PATENT OFFICE 2,419,528

CATALYTIC CONVERSION APPARATUS

John Biegel, Kansas City, Mo., assignor to Phillips Petroleum Company, a corporation of Delaware Application May 13, 1944, Serial No. 535,503

2 Claims. (Cl. 23—260)

The present invention relates to apparatus for carrying out a catalytic conversion and recovering a desired product from the conversion effluent. More particularly it relates to apparatus embodying a fractional distillation column and means for controlling the same in accordance with the composition of the feed thereto. In one embodiment, the invention relates to apparatus for synchronizing the variation in catalyst activity and therefore variation in the composition of the conversion effluent, or a fraction thereof which contains the desired product, with the operation of the purification system wherein the desired and undesired components are separated from each other. More specifically, the invention in the aspect under discussion relates to means for changing feed entries to a frictionating column to correspond to changes in feed composition caused by reduced catalyst activity in the conversion unit.

In particular, the invention relates to an apparatus especially adapted for recovering butadiene from the effluent from the dehydrogenation of normal butene such as the second stage dehydrogenation effluent in a process for conversion of normal butane to butadiene. As the butene dehydrogenation reaction proceeds, the catalyst activity gradually decreases due to the deposition of carbon on the surface of the catalyst. This reduced catalyst activity results in a change in the composition of the feed stream being introduced to the purification system. This variation in stream composition is undesirable since it makes it extremely difficult or impossible to maintain constant percentages of the various components in the overhead and bottom product streams from the fractionating column.

The principal object of the present invention is to provide improved apparatus for recovering a desired product from an impure feed stream by fractional distillation.

Another object is to provide an improved apparatus for carrying out a catalytic conversion and recovering a desired product from the conversion effluent by fractional distillation.

Another object is to provide an improved apparatus for carrying out the dehydrogenation of normal butene to butadiene and recovering butadiene in substantially pure form from the conversion effluent.

Another object is to provide an apparatus of the foregoing type adapted to carry out the second stage dehydrogenation in the manufacture of butadiene from normal butane and the recovery of the butadiene from the second stage effluent. Numerous other objects will more fully hereinafter appear.

In the accompanying drawing:

Figure 1 is a diagrammatic representation of apparatus for carrying out a catalytic conversion and recovery of the desired product by fractional distillation of a fraction derived from the conversion effluent, all in accordance with one embodiment of the present invention.

Figure 2 portrays diagrammatically an apparatus for controlling the operation of the fractionator in accordance with the composition of the fractionator feed in accordance with another embodiment of the present invention.

The apparatus of the present invention comprises, in combination, a catalytic converter, a product fractionator, conduit means for supplying a stream of product-containing impure material derived from the effluent of the converter to the fractionator, a plurality of feed inlets arranged to discharge the stream of impure material to be fractionated into the fractionator at different levels therein and means for connecting the conduit means selectively to one of said feed inlets in accordance with the composition of the stream of impure product-containing material. Thus, the present invention provides a means for overcoming the difficulties of the prior art practice attributable to fluctuations in the feed stream composition. It does this by changing the position of the feed entry to the fractional distillation column to correspond to changes in the feed stream composition. In one embodiment this may be done by changing the position of the feed entry to correspond to the reduction in catalyst activity in the conversion unit. Thus, the present invention makes possible the withdrawal from the fractional distillation column, wherein the product is separated, of a top product having a constant composition and a bottom product likewise having a constant composition or of top and bottom products having a constant relationship to each other in composition.

The invention is advantageous in that it makes possible the more efficient use of a fractional distillation column of a given number of trays by permitting the use of a lower quantity of reflux than in a fractionator operated in the conventional manner. Alternatively, if desired, the present invention enables the attainment of a higher degree of separation with a given quantity of reflux by having the feed entry in the proper or optimum position at all times. Another advantage is that surge tanks for the feed can be eliminated or greatly reduced in size. Still other advantages will be evident to those skilled in the art. There is also a structural advantage represented by the saving in steel tonnage requirements by permitting the use of a smaller diameter column, due to the lower reflux requirements.

In one embodiment of the present invention, the feed entry to the product fractionator can be changed by putting motor valves in lines entering the column at various tray levels and interlocking the activating mechanisms on these valves with the time-cycle device which controls the periodic opening and closing of valves on the catalyst case. In another embodiment, the optimum feed entry is determined by means of a continuously analyzing device, such as a continuously analyzing spectrophotometer, which continuously analyzes the feed to the fractionator, means being provided for varying the point of feed entry to correspond with changes in the composition of the feed. For example, the continuously analyzing spectrophotometer is set to analyze for one component, such as butadiene, and the point of feed entry is varied to correspond to changes in the concentration of that component.

Thus, the present invention makes it possible to synchronize the variation in catalyst activity with the operation of the purification system when the composition of the fractionator feed stream is variable but can be predicted by the length of time the converter has been on stream or measured instantaneously and continuously.

Referring now to Figure 1, the catalytic converter is designated by reference numeral 1. The feed enters via lines 2 and 3 and the effluent leaves via lines 4 and 5 and is passed to separation equipment 6 of any suitable type for the separation of any suitable fraction which contains the desired product and constitutes the fractionator feed. In some cases the conversion effluent is adapted to be used directly as the fractionator feed in which case the separation equipment 6 may be dispensed with as indicated by the by-pass line 7. The fractionator feed passes via line 8 to fractionator 9 which is provided with a plurality of feed lines 11, 12, 13, 14, 15 and 16 equipped with motor valves 17, 18, 19, 20, 21, and 22 respectively which are actuated by compressed air, the flow of same being controlled by the action of solenoid valves designated generally by reference numeral 23. The overhead product from fractionator 9 leaves via line 24 and the bottoms product via line 25. Compressed air is supplied to unit 23, via line 26 and is connected to motor valves 17 to 22 by conduits shown.

When the converter 1 is on regeneration, the regeneration gases enter via line 27 and leave via line 28. Lines 2, 5, 27 and 28 are provided with air actuated motor valves 29, 30, 31 and 32 respectively which are activated by solenoid valves indicated by unit 33. The solenoid valve manifold in unit 33 is supplied with compressed air entering via line 34 and connected to valves 29, 30, 31 and 32 by the air lines shown. A master time-cycle controller 35 is provided which is connected by electric wires indicated generally by reference numeral 36 to the solenoid valve manifold 23. Time-cycle controller 35 is also connected by wires indicated generally by reference numeral 37 to solenoid valve unit 33. As the converter remains on stream and the activity of the catalyst is reduced because of carbon deposition, the master time-cycle controller 35 sends out impulses to the solenoid valves 23. These solenoid valves 23, upon receiving these impulses, either apply or release air pressure from the diaphragms of the motor valves 17 to 22 causing the valves to open or close as desired. Thus, at one time during the cycle, the composition of the conversion effluent is such that line 11 is the most desirable or optimum feed entry line for the fractionation being performed.

When this condition exists, the controller 35 sends out impulses to the solenoid valves 23 to open valve 17 in line 11 and leave valves 18 to 22 in lines 12 to 16 respectively, closed. As the conversion cycle proceeds, the composition of the feed stream will change in such a manner that the optimum feed entry will be via line 12 when valve 18 in line 12 will be opened, valve 17 in line 11 closed and the remaining valves 19 to 22 will remain closed.

It will be understood that time-cycle controller 35 controls the admission of feed or of regeneration gases and the exit of conversion effluent or regeneration gases by means of the wires 37 which send electrical impulses to solenoids 33 which control the application of air to valves 29 to 32 in such a manner as to maintain converter 1 on-stream for the proper period of time during which the conversion effluent is passed via lines 5 and 8 to fractionator 9, whereupon the converter 1 is switched to regeneration for the proper period of time during which the converter effluent is withdrawn via line 28. When converter 1 is on regeneration all the feed lines to the fractionator 9 are closed and the fractionator is operated under total reflux where there is only one converter. For simplicity the discussion is limited to one converter, but it will be understood that generally two or more converters are used, one or more being on regeneration cycle while the other or others are on conversion cycle. With such an arrangement it will not be necessary to close the feed lines to the fractionator and operate at total reflux as explained above while regeneration operations are being conducted.

Referring now to Figure 2, the fractionator feed which is derived from any suitable source not shown, which source may be a catalytic converter or any other source, is fed via line 8 and one of lines 11 to 16 to fractionator 9 as in Figure 1. A small stream of the feed is passed continuously via line 40 to continuous analyzer 41 where it is analyzed continuously for a certain component or for composition in any manner. The results of the analysis are continuously employed to automatically control the use of feed entry in column 9. This may be accomplished in any desired manner. As shown, it takes the form of control lines 42 which transmit impulses from the analyzing means 41 to the solenoid valve manifold 23 to which compressed air is admitted as before via line 26 and from which it passes to motor valves 17 to 22 to control the opening and closing thereof. Thus, as the feed in line 8 fluctuates in composition, the proper or optimum point of feed entry is automatically and substantially instantaneously selected so that fractionator 9 operates to produce constant results despite the fluctuations in the feed composition.

It will be obvious to those skilled in the art that any means known to the art may be used in connection with the apparatus of Figure 2 to prevent too rapid changes in the setting of the motor valves, such as interlocking mechanism so designed that if the composition of the feed changes suddenly, the point of feed entry is not changed immediately but may not be changed until after the change in composition has been in effect for a given period of time. Any other means of checking the speed with which the control mechanism operates may be provided. Such means is standard with all control equipment manufacturers and need not be described here. It will suffice to state that its purpose is to prevent changes in the point of feed entry for momentary fluctuations in feed composition. For example, if the feed composition momentarily changes to such an extent as to require a different feed entry point but immediately reverts to its former composition, it is obviously undesirable that the point of feed entry be changed for this momentary period of time. The provision of such known retarding means makes for stability in operation and prevents unduly rapid wear of the control mechanism.

The term "normal butene" as used in this specification and in the claims appended hereto is intended to cover butene-1 and both high and low boiling butene-2.

I claim:

1. Apparatus for carrying out catalytic conversion and recovering a desired component of the conversion effluent comprising in combination a catalytic converter having an inlet and outlet for the admission of raw material and the outflow of conversion products, a fractionating column, conduit means connecting the outlet of the converter and said column and arranged to discharge into said column through a plurality of feed inlets at different selective levels therein, valves in said feed inlets, valves in said inlet and outlet of said converter, automatic operating means for said valves, common timing means for said operating means arranged to selectively hold open that one of said first-named valves which will maintain overhead and bottom product streams of constant composition from said fractionator.

2. Apparatus for carrying out catalytic conversion and recovering a desired component of the conversion effluent comprising in combination a catalytic converter having an inlet and outlet for the admission of raw material and the outflow of conversion products and an inlet and an outlet for the admission of regeneration gas and the outflow of regeneration effluents, a fractionating column, conduit means connecting the first-named outlet of the converter and said column and arranged to discharge into said column through a plurality of feed inlets at different selective levels therein, valves in said feed inlets, valves in said inlets and outlets of said converter, automatic operating means for said valves, common timing means for said operating means arranged to selectively hold open that one of said first-named valves which will maintain overhead and bottom product streams of constant composition from said fractionator and arranged to close said first-named valves while the valves in the first-named inlet and outlet are closed and the valves in the second-named inlet and outlet are open.

JOHN BIEGEL.

REFERENCES CITED

The following references are of record in the file of this patent:

UNITED STATES PATENTS

| Number | Name | Date |
| --- | --- | --- |
| 1,957,818 | Carney | May 8, 1934 |
| 1,670,762 | Cross | May 22, 1928 |
| 2,367,862 | Gormley | Jan. 23, 1945 |
| 2,350,006 | Wolfner | May 30, 1944 |
| 2,321,175 | Binckley | June 8, 1943 |
| 2,217,641 | Junkins | Oct. 8, 1940 |
| 2,217,634 | Rude | Oct. 8, 1940 |